United States Patent [19]

Mölz

[11] Patent Number: 5,081,750
[45] Date of Patent: Jan. 21, 1992

[54] GRIPPER CARRIAGE AND TRANSPORT ASSEMBLY FOR A STRETCHING FRAME

[75] Inventor: Udo Mölz, Wiehl-Bielstein, Fed. Rep. of Germany

[73] Assignee: Kampf GmbH & Co. Maschinenfabrik, Mühlen, Fed. Rep. of Germany

[21] Appl. No.: 574,262

[22] Filed: Aug. 28, 1990

[30] Foreign Application Priority Data

Aug. 29, 1989 [DE] Fed. Rep. of Germany ....... 3928454

[51] Int. Cl.⁵ .............................................. D06C 3/02
[52] U.S. Cl. ........................................... 26/89; 26/73; 26/93; 198/838
[58] Field of Search ................... 26/72, 73, 89, 93, 95, 26/96; 198/838, 845; 34/162

[56] References Cited

U.S. PATENT DOCUMENTS

| | | | |
|---|---|---|---|
| 3,748,704 | 7/1973 | Schmidt et al. | 26/93 |
| 3,765,067 | 10/1973 | Fisher | 26/72 |
| 3,890,421 | 6/1975 | Habozit | 26/72 X |
| 4,134,189 | 1/1979 | Richter | 26/89 |
| 4,602,407 | 7/1986 | Gresens | 26/89 |
| 4,674,159 | 6/1987 | Sclater et al. | 26/89 X |
| 4,729,470 | 3/1988 | Bacigalupe et al. | 198/838 |
| 4,890,365 | 1/1990 | Langer | 26/73 |

FOREIGN PATENT DOCUMENTS

| | | | |
|---|---|---|---|
| 1186032 | 4/1959 | France | 198/838 |
| 0705029 | 12/1979 | U.S.S.R. | 26/72 |
| 937110 | 9/1963 | United Kingdom | 198/838 |

Primary Examiner—Werner H. Schroeder
Assistant Examiner—John J. Calvert
Attorney, Agent, or Firm—Herbert Dubno

[57] ABSTRACT

An assembly for a stretching frame has a rectangular cross section rail, a multiplicity of carriages displaceable along the rail and formed with shanks which have offset pairs of rollers engaging the surface of the rail perpendicular and parallel to the plane, and couplings on the shanks located substantially in the median plane between the surfaces of the rail perpendicular to the frame for engagement by respective transport devices.

15 Claims, 5 Drawing Sheets

GRIPPER CARRIAGE AND TRANSPORT ASSEMBLY FOR A STRETCHING FRAME

FIELD OF THE INVENTION

My present invention relates to an assembly for engaging and transporting web to be stretched and forming part of a stretching frame.

More particularly, the invention relates to a carriage and transport device for such a stretching frame. A U-shaped carriage is provided having its shanks straddling a rectangular guide rail, the carriage possessing arms lying generally parallel to a plane of the stretching frame. Each arm carries two guide rollers which engage opposite guide surfaces lying perpendicular to the stretching frame plane on the rail. Two further guide rollers are present which engage guide surfaces lying parallel to the stretching frame plane. The perpendicularly oriented rollers located on the two shanks are offset from one another in a travel direction along the rail.

BACKGROUND OF THE INVENTION

A stretching frame can comprise a pair of rails extending along edges of the path of a web to be stretched and can have mutually divergent portions in the stretching plane so that the gripper carriages as they are displaced along the rail and which can engage opposite edges of the web, travel away from one another to effect traverse stretching while applying tension to the web and generate longitudinal stretching thereof. The result is a bidimensional or biaxial stretching of the web.

In German Patent Application DE-AS 2 058 575 equivalent to U.S. Pat. No. 3,748,704 the latter being herein incorporated by reference, a stretching frame assembly for such purposes is described. This assembly can have a one-piece guide rail having running surfaces parallel to the stretching frame plane and defining a U-shaped guide channel between shanks of which respective guide rollers of the gripper carriage are received. A drawback of this system is that these guide rollers uncontrollably engage alternately one guide surface and the other so that the direction of rotation of the guide rolls respectively changes depending upon which surface is engaged. This has been found to have undesirable effects upon the manner in which the carriage moves, the loading of the guide surfaces and the like.

The gripper carriage in this arrangement has coupling means for various transport devices, namely, a roller for a guide track and a pin for a transport chain. However, the different transport devices act upon the carriage differently from one another. A shock free engagement by a transport device or shock free transition between the disengagement of one transport device and the engagement of another as the carriage travels along the rail is therefore difficult to achieve. This also applies to transport devices having adjustable travel speed.

By and large, therefore, it can be said that the stretching frame assemblies described in the aforementioned reference can be improved upon.

OBJECTS OF THE INVENTION

It is, therefore, the principal object of the present invention to provide an improved stretching frame assembly whereby drawbacks of the earlier system are avoided.

Another object of the invention is to provide a gripper carriage, rail and transport assembly which has improved running characteristics and enables shock free engagement of the carriage by successive transport devices.

SUMMARY OF THE INVENTION

These objects and others which will become more apparent hereinafter are attained, in accordance with the invention in an assembly which includes a generally rectangular guide rail, a traveling-clamp carriage and a transport device.

The generally rectangular guide rail defines one side of the web-stretching frame and lies in a plane generally parallel to a stretching plane of a web of material to be stretched. The guide rail has a first pair of opposite running surfaces generally parallel to the planes and a second pair of opposite running surfaces generally perpendicular to the planes. The traveling-clamp carriage is displaceable along the rail in a travel direction to stretch the web. The carriage includes a substantially U-shaped frame, a device for gripping a web, first and second pairs of guide rollers, and a coupling means.

The substantially U-shaped frame has respective shanks straddling the guide rail and disposed respectively above and below the guide rail. There is also a connecting member bridging the shanks. On the connecting member is situated a device operable to grip the web. The respective first pair of guide rollers on each shank rollingly engage a respective surface of the first pair of opposite running surfaces. The first guide rollers of one of the shanks are offset in the direction relative to the first guide rollers of the other of the shanks. Respective second pair of guide rollers on each shank rollingly engage a respective surface of the second pair of opposite running surfaces. The second guide rollers of the one of the shanks are offset in the direction relative to the second guide rollers of the other of the shanks. Respective coupling means are disposed substantially centrally between the surfaces of the second pair on each of the shanks for entrainment of the carriage along the guide rail. The transport device is displaceable in the direction and engageable with one of the coupling means for entraining the carriage in the direction.

More specifically, the invention provides a U-shaped carriage having upper and lower shanks with offset pairs of rollers engaging the vertical and horizontal surfaces of the rectangular-cross section rail. Substantially midway between the surfaces perpendicular to the stretching frame plane on each shank, a respective coupling means is provided for a respective transport device.

Thus the invention differs from the prior art arrangements in at least two ways. First, the invention arrangement has two pairs of guide rollers on each shank engageable with the opposite guide surfaces perpendicular to the stretch frame plane and the respective horizontal guide surfaces of the rectangular rail and so that the respective pairs of rollers of one shank are offset in the longitudinal travel section from the rolls of the corresponding pairs of the other shank. This arrangement establishes a secure bracing of the carriage in all three spacial directions (all three directions of a cartesian coordinated system). Second, the invention arrangement differs in having coupling means on each shank so that the point of action lies substantially in a median plane of the carriage perpendicular to the stretching frame plane. As a consequence, the engagement of the carriage by the respective and various transport devices applies force to the carriage at an optimum location, thereby improving the carriage travel. Especially along curved rail segments, no unusual stresses are applied to the carriage or the rail by the transport devices.

A certain slip between the carriage and the transport device is possible where the transport device is formed as a chain with laterally extending plates which are engaged between juxtaposed clamping shoes constituting a respective formation on a carriage.

To ensure a reliable engagement between the carriages and the transport device, it has been found to be advantageous to provide the spacing of the plates along the chain so that this space is less than the minimum distance which can be provided between successive carriages.

A yieldable engagement is ensured by forming the clamping shoes with spring-biased brake linings which bear upon a chain plate received between them. This arrangement insures a force locking entrainment of the carriage by the chain without a form locking engagement which would prevent the yieldability and slip which may be desired. The carriage can thus shift, depending upon the requirements of the transport direction, on the plates so that a compensation for different transport speeds and different spacing of the parts or the like can occur automatically.

Another slip-type of engagement can be provided between a transport device and the carriages by forming the respective shank with a fixed formation against which a spring loaded swingable clamping member can engage a belt-like strand constituting the transport device and displaceable on pulleys, rollers or the like.

The other coupling means on the other shank of the carriage can be a form-locking coupling member, for example, a pin which engaged by a lug of a transport chain. A shock free coupling can be generated by forming the other shank with a tooth engaging a pin of the chain and providing the tooth curve as an involute.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
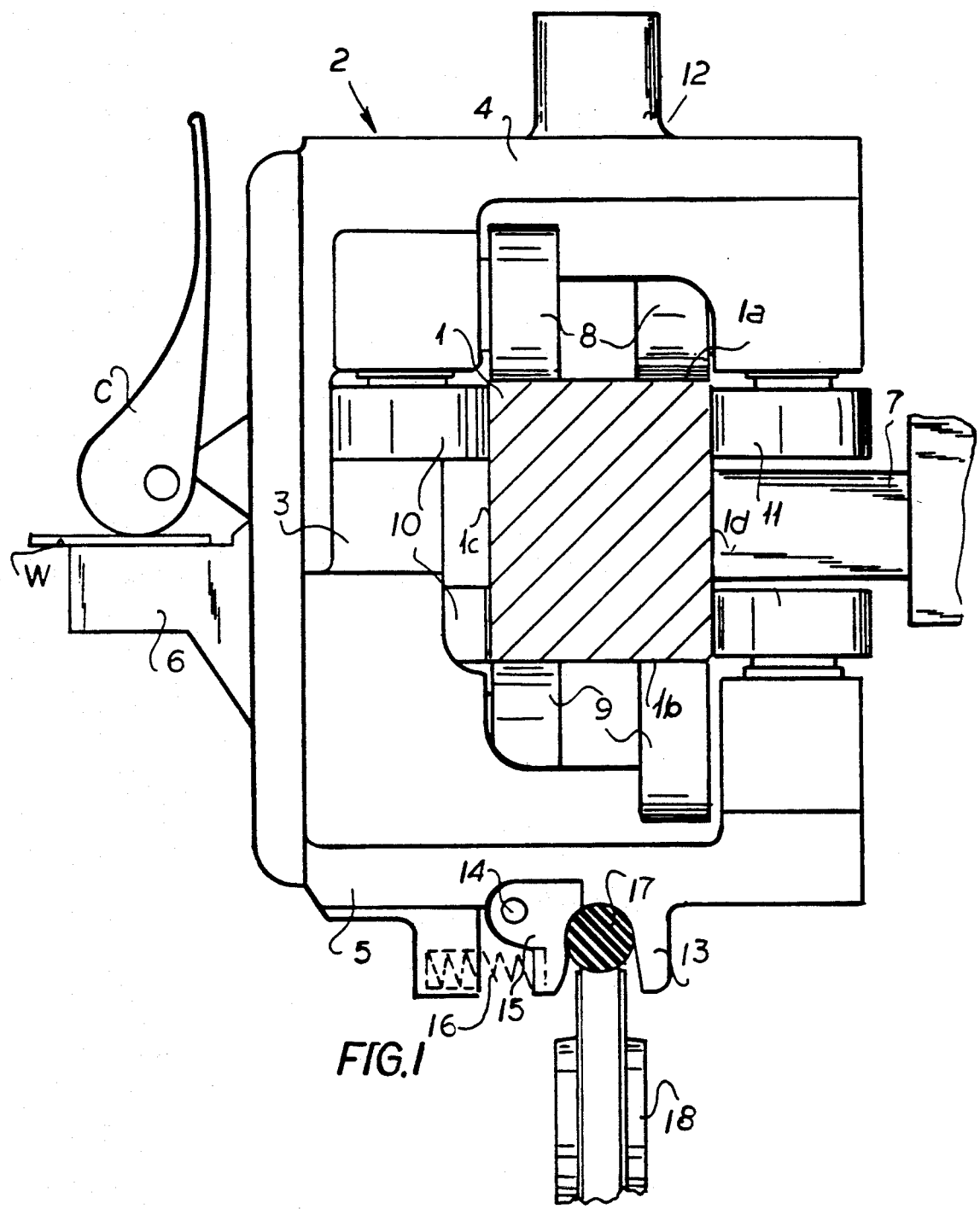
FIG. 1 is an elevational view of a carriage of an assembly according to the invention seen in the transport direction and showing the rail and transport device in section and the means for clamping the web in diagrammatic form.

FIG. 1 shows a rectangular cross section guide rail 1 which is connected by support 7 or the like with a machine frame of a stretching apparatus. The rail 1 has horizontal surfaces 1a and 1b which are parallel to the stretching plane and vertical surfaces 1c and 1d which are perpendicular to the stretching plane. The stretching plane may be defined by a web W, e.g. of a synthetic resin or plastic material, to be biaxially stretched and which is clamped by an eccentric clamp C or gripper against a clamping table shown at 6 in FIG. 1. The rail and gripper arrangement of FIG. 2 can be of similar design.

The carriage 2 has a U-shaped frame with a bridging member 3 and a pair of shanks 4 and 5 extending parallel to the stretching frame plane.

The receiving table 6 for the foil web W or some other web to be stretched, is formed on the bridging member 3. Other clamping arrangements for engaging the web against the clamping table can be used if desired.

Each shank 4 and 5 has respective bearings in which are journaled two guide rollers 8 and 9, respectively, offset from one another in the travel direction which is perpendicular to the plane of paper in FIG. 1 but also offset from the rollers of the other shank.

The rollers 8 and 9 respectively engage the surfaces 1a and 1b.

The shanks 4 and 5 have bearings for further transport rollers 10 and 11 which are provided in pairs and are likewise offset from one another in the direction of travel. The rollers 10 engage the surface 1c and the rollers 11 engage the surface 1d.

Because the pairs of rollers 10 and 11 and the pairs of rollers 8 and 9 are offset from one another in the transport direction, an eight roller mounting is provided for the carriage on the rail in the form of two four-membered groups of rollers in two different planes perpendicular to the travel direction. The offset relationship ensures a substantially play-free guidance and full support against torsion in all three spacial directions for the carriage on the rail. An entraining pin 12 is provided on shank 4 which can engage in a notch in a lug or a gap between lugs of a transport chain forming a moving device which is not shown in this figure.

On the opposite shank 5, however, another coupling means is provided in the form of a fixed formation 13 and a clamping member 15 which is swingable about a pivot 14 and which is biased by a spring 16 toward the formation 13. Between the clamping member 15 and the formation 13, a belt-like strand 17 of a transport device can be engaged. This strand can be a cable, a band, a belt or the like. A roller 18 of the strand 17 forces the strand into the gap between the clamping member 15 and the formation 13 where the strand is frictionally engaged. The friction force is dependent, of course, on the force delivered by the spring 16. The entraining pin 12 of the carriage ensures a form-locking entrainment by the respective transport device while the coupling means constituted by the formation 13 and the clamping member 15 provides a force-locking entrainment so that the action of this device 17 allows a certain slip of the carriage relative to the transport device. As a consequence, it is not necessary to ensure any particular synchronization between the speeds of the carriages and the transport devices engaged with them upon such engagement.

Figure 2:
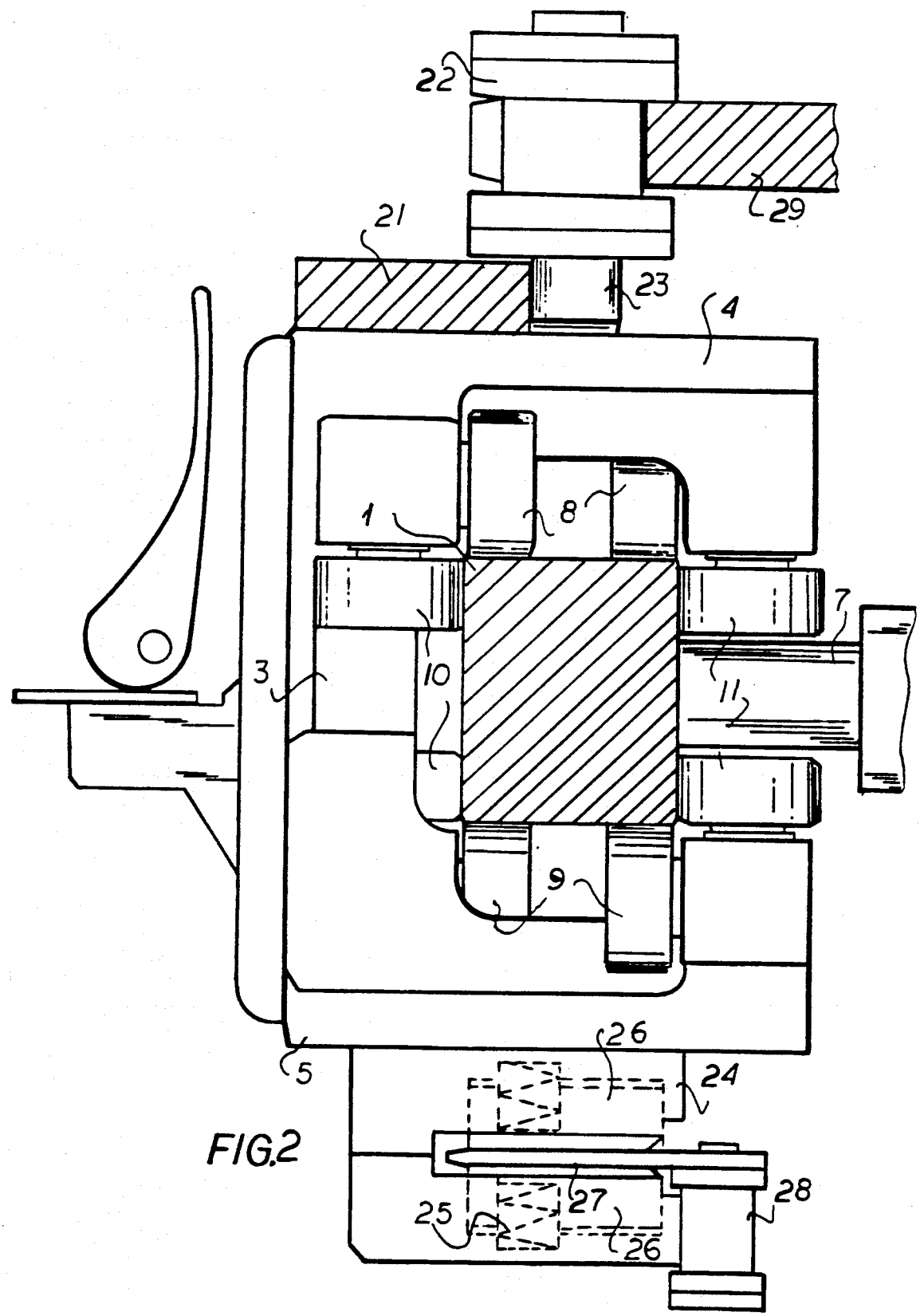
FIG. 2 is a view similar to FIG. 1 showing a modified carriage for a different type of transport device.
Figure 3:
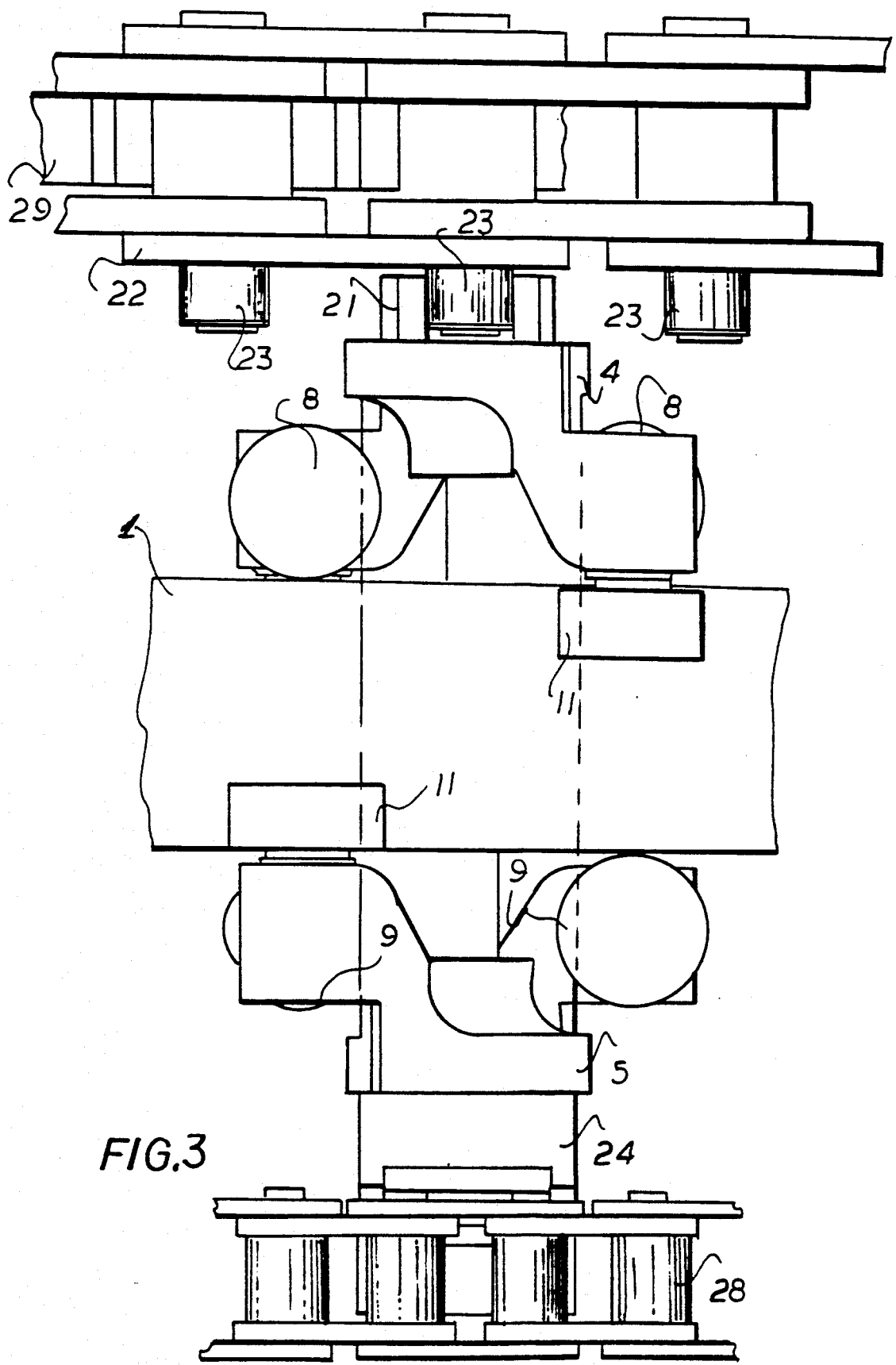
FIG. 3 is a side elevational view of the embodiment shown in FIG. 2.
Figure 4:
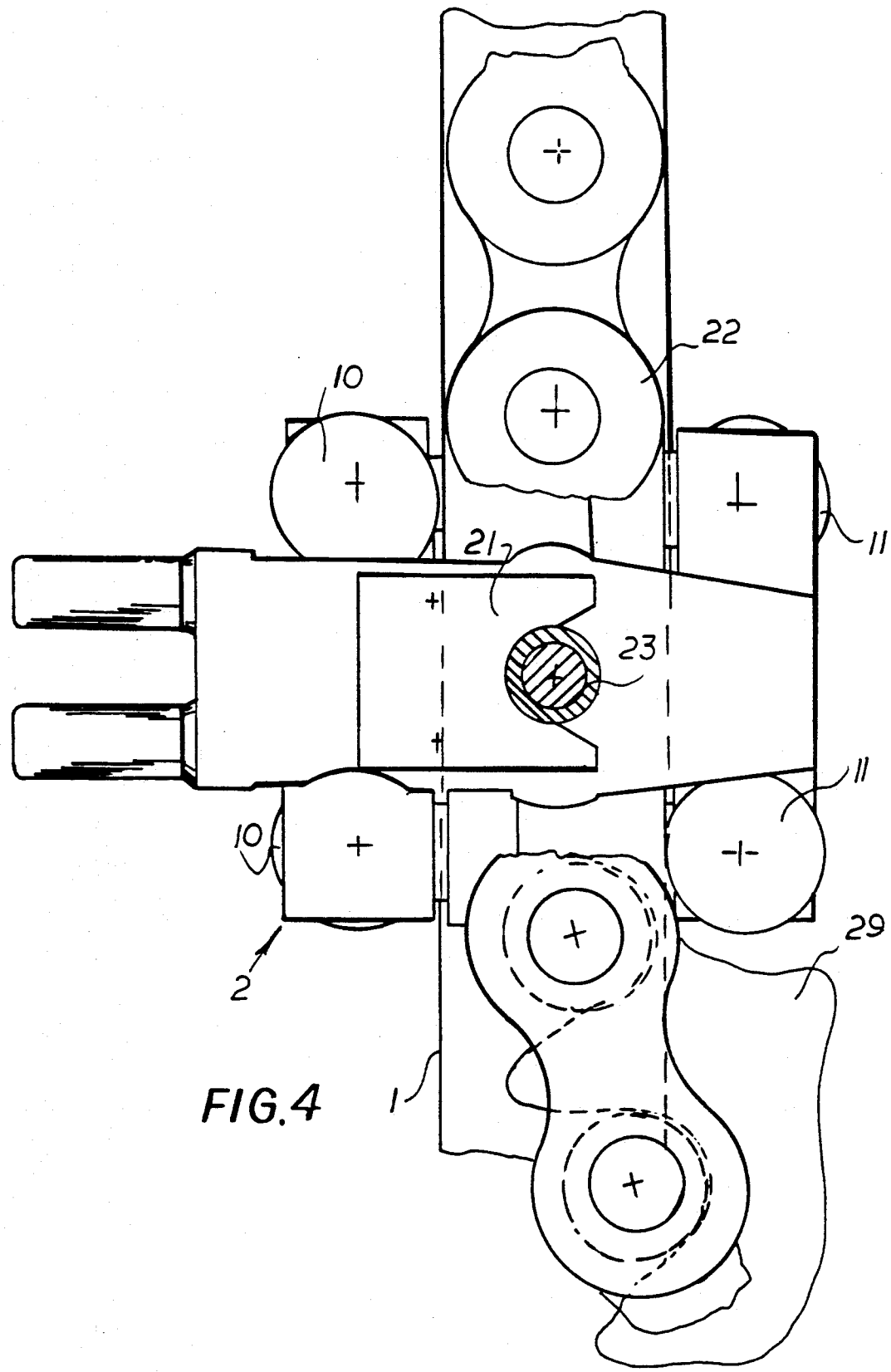
FIG. 4 is a top plan view of the embodiment shown in FIGS. 2 and 3.

FIG. 2 shows a modification of the construction of FIG. 1 in which the shank 4 is provided with a transport tooth 21 as its coupling means, the tooth 21 (FIG. 4) having an involute-shaped tooth line. A chain 22 has entrainment pins 23, one of which can engage in this tooth 21. As has been shown in FIG. 4 each entrainment pin is formed as a roller or can have some other slidable sleeve which can provide a low friction engagement in the tooth. The involute shape of the tooth 21 allows a uniform and shock-free engagement of the chain therewith. A sprocket wheel 29 serves to drive the chain 22.

Figure 5:
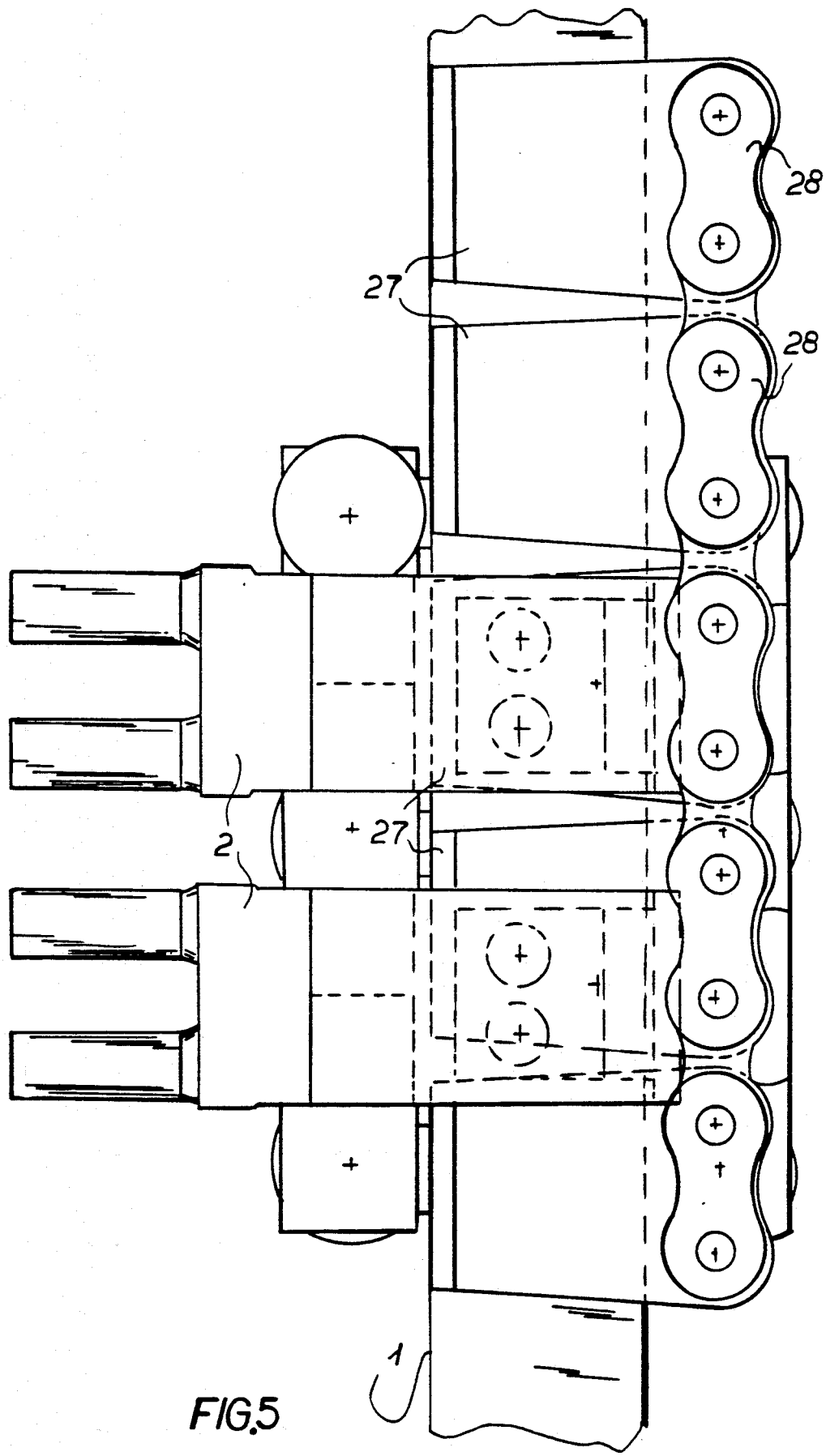
FIG. 5 is a bottom plan view of the assembly of FIGS. 2 and 3.

The shank 5, in this embodiment, comprises a pair of juxtaposed clamping shoes 24 in which brake linings 26 are biased toward one another by springs 25. The brake linings, however, leave a gap between them into which a laterally extending plate 27 of the chain 28 can engage (see also FIG. 5).

The plates 27 have a smaller spacing between them than the minimum spacing of successive carriages 2 from one another to ensure reliable engagement of the plates of the chain in all of the carriages. The techniques of the plates 27 is less than the gap width between the brake linings so that the plates are frictionally engaged thereby. The spacing of the plates on the chain and the spacing of the carriages from one another can, of course, be different as long as the aforementioned conditions are observed.

The brake linings permit a certain slip of the plates within the clamping shoes so that the speeds of the chain and the carriages can differ as well as in a slip of the chain relative to the carriages which is especially important for the return travel of the carriages where the carriages abut one another and a precise synchronization of the speeds of the chain and the carriages is scarcely possible.

The described transport device and coupling means can be used in any combination on the carriages. The carriages and the transport devices can be used for all stretching frames. For example, they may be employed in a biaxial simultaneous stretching frame, a longitudinal stretching frame or a transversing stretching frame. The material to be stretched can be in the form of foils, strips or the like of any desired materials, for example, plastics, nonwovens or textiles.

I claim:

1. A traveling-clamp carriage assembly for a web-stretching frame, comprising:
    a generally rectangular guide rail defining one side of said web-stretching frame and lying in a plane generally parallel to a stretching plane of a web of material to be stretched, said guide rail having a first pair of opposite running surfaces generally parallel to said planes and a second pair of opposite running surfaces generally perpendicular to said planes;
    a traveling-clamp carriage displaceable along said rail in a travel direction to stretch said web, said carriage comprising:
        a substantially U-shaped frame having respective shanks straddling said guide rail and disposed respectively above and below said guide rail, and a connecting member bridging said shanks,
    means on said connecting member operable to grip said web,
    a respective first pair of guide rollers on each shank rollingly engaging a respective surface of said first pair of opposite running surfaces, said first guide rollers of one of said shanks being offset in said direction relative to said first guide rollers of said other of said shanks,
    a respective second pair of guide rollers on each shank rollingly engaging a respective surface of said second pair of opposite running surfaces, said second guide rollers of said one of said shanks being offset in said direction relative to said second guide rollers of said other of said shanks, and
    respective coupling means disposed substantially centrally between the surfaces of said second pair on each of said shanks for entrainment of said carriage along said guide rail; and
    a transport device displaceable in said direction and engageable with one of said coupling means for entraining said carriage in said direction.

2. The traveling-clamp carriage assembly for a web-stretching frame as defined in claim 1 wherein said transport device comprises a chain having plates projecting laterally therefrom, said one of said coupling means comprising a pair of clamping shoes engaging at least one of said plates between them.

3. The traveling-clamp carriage assembly for a web-stretching frame as defined in claim 2 wherein a plurality of said carriages are disposed along said rail, said plates having a spacing along said chain which is less than a smallest possible spacing of said carriages from one another.

4. The traveling-clamp carriage assembly for a web-stretching frame as defined in claim 2 wherein said clamping shoes are formed with brake linings biased by springs against said at least one plate.

5. The traveling-clamp carriage assembly for a web-stretching frame as defined in claim 1 wherein said transport device is an elongated continuous flexible strand and said one of said coupling means includes a support formation projecting from and rigid with the respective shank and a spring-loaded swingable clamping member spacedly juxtaposed with said support formation and clamping said strand thereagainst.

6. The traveling-clamp carriage assembly for a web-stretching frame as defined in claim 1 wherein said one of said coupling means is an entrainment pin projecting from the respective shank and said transport device is a chain having a formation engageable with said pin.

7. The traveling-clamp carriage assembly for a web-stretching frame as defined in claim 1 wherein said one of said coupling means is a transport tooth with an involute tooth curve and said transport device is a transport chain provided with a pin engageable in said tooth.

8. The traveling-clamp carriage assembly for a web-stretching frame as defined in claim 7, further comprising another transport device comprising a chain having plates projecting laterally therefrom, the other of said coupling means comprising a pair of clamping shoes engaging at least one of said plates between them.

9. The traveling-clamp carriage assembly for a web-stretching frame as defined in claim 8 wherein a plurality of said carriages are disposed along said rail, said plates having a spacing along said chain which is less than a smallest possible spacing of said carriages from one another.

10. The traveling-clamp carriage assembly for a web-stretching frame as defined in claim 8 wherein said clamping shoes are formed with brake linings biased by springs against said at least one plate.

11. The traveling-clamp carriage assembly for a web-stretching frame as defined in claim 7, further comprising another transport device including an elongated continuous flexible strand, the other of said coupling means including a support formation projecting from and rigid with the respective shank and a spring-loaded swingable clamping member spacedly juxtaposed with said support formation and clamping said strand thereagainst.

12. The traveling-clamp carriage assembly for a web-stretching frame as defined in claim 6, further comprising another transport device comprising a chain having plates projecting laterally therefrom, the other of said coupling means comprising a pair of clamping shoes engaging at least one of said plates between them.

13. The traveling-clamp carriage assembly for a web-stretching frame as defined in claim 12 wherein a plurality of said carriages are disposed along said rail, said plates having a spacing along said chain which is less than a smallest possible spacing of said carriages from one another.

14. The traveling-clamp carriage assembly for a web-stretching frame as defined in claim 12 wherein said clamping shoes are formed with brake linings biased by springs against said at least one plate.

15. The traveling-clamp carriage assembly for a web-stretching frame as defined in claim 7, further comprising another transport device including an elongated continuous flexible strand, the other of said coupling means including a support formation projecting from and rigid with the respective shank and a spring-loaded swingable clamping member spacedly juxtaposed with said support formation and clamping said strand thereagainst.

* * * * *